United States Patent [19]

Czernik et al.

[11] 4,331,336

[45] May 25, 1982

[54] HEAD GASKETS AND METHOD OF MAKING SAME

[75] Inventors: Daniel E. Czernik, Hinsdale; John C. Moerk, Jr., Buffalo Grove, both of Ill.

[73] Assignee: Felt Products Mfg. Co., Skokie, Ill.

[21] Appl. No.: 186,126

[22] Filed: Sep. 11, 1980

[51] Int. Cl.³ .......................... F16J 15/12; B23P 11/00
[52] U.S. Cl. ............................................ 277/1; 277/9; 277/235 B; 29/446
[58] Field of Search .................... 277/1, 9, 9.5, 235 R, 277/235 A, 235 B; 29/148.4 S, 446

[56] References Cited

U.S. PATENT DOCUMENTS

| | | | |
|---|---|---|---|
| 3,960,048 | 6/1976 | Wagner | 29/446 |
| 4,125,929 | 11/1978 | Rode | 29/446 |
| 4,214,444 | 7/1980 | Fujioka et al. | 277/235 B X |
| 4,254,963 | 3/1981 | Skrycki | 277/235 B X |

FOREIGN PATENT DOCUMENTS 1240378  7/1971  United Kingdom ............ 277/235 B

*Primary Examiner*—Robert S. Ward, Jr.
*Attorney, Agent, or Firm*—Dressler, Goldsmith, Shore, Sutker & Milnamow, Ltd.

[57] ABSTRACT

A method of manufacturing a cylinder head gasket comprising the steps of preassembling a main gasket body and a fire ring and then precompressing the gasket to alter the characteristics of one of the gasket body and fire ring, so that a portion of the available design head load will be taken up by each of the gasket body and fire ring when the precompressed gasket is assembled in an engine at the available design head load. The precompressed gasket fire ring displays different thickness and compression characteristics resulting from the precompression of the preassembled gasket, enhancing the capacity of the gasket effectively and consistently to seal a head and block at the available design head load.

20 Claims, 4 Drawing Figures

HEAD GASKETS AND METHOD OF MAKING SAME

This invention relates to improved cylinder head gasket assemblies and to methods of making such gaskets.

Particularly in large high compression internal combustion engines operating at high temperatures and pressures it has been a practice for a number of years now to provide head gaskets with armoring adjacent the cylinder or combustion openings to seal the combustion openings and to protect the remainder of the gasket from the influences of the high temperature and pressure in the cylinders. Frequently the gasket body itself comprises thin elastomeric bonded asbestos sheets laminated to a central metallic core.

In such gaskets the armoring generally comprises a U-shaped annulus which overlies the periphery of the main gasket body adjacent the combustion opening and which encloses one or more wire rings. Alternatively the metallic armoring may terminate substantially adjacent the aperture in the main gasket body and may have tabs or like elements which overlie the main gasket body. Typical armoring and wire ring constructions are shown in U.S. Pat. Nos. 1,819,694, 3,532,349, 3,560,007 and 3,565,449.

Although such gaskets, when appropriately proportioned, effectively serve both to seal the head and block in the main gasket body area and the combustion opening in the region of the armoring, as well as to insulate the main body portion of the gasket from the cylinders, sometimes such gaskets fail fully to seal for the prolonged periods during which they are intended to so seal.

For such a gasket assembly properly to seal and effectively to insulate the main gasket body from the conditions extant in the cylinders of the engine, an appropriate fraction of the load imposed on the gasket when the head is torqued down on the block must be selectively impressed in each of the gasket assembly zones. Thus the armoring must be properly loaded to prevent combustion gases and the like from passing outwardly across the main gasket body, and the main gasket body must be appropriately and sufficiently loaded to prevent oil and water from leaking across the surfaces of the main gasket body.

Thus, all of the characteristics of the armored gasket parts are considered and matched by the designer in arriving at a gasket construction which will properly seal in all zones when used in the selected environment. Such considerations include the materials, their degrees of compressibility, the thicknesses of the materials, and the like.

Although theoretically it is possible to select gasket parts of predetermined thicknesses for assembly into a precisely dimensioned gasket assembly, there are, of course, tolerances built into the manufacturing practices employed in making the several parts and components. Thus, the main gasket body may have a range of tolerances, plus or minus, and the wire ring may also have a range of tolerances plus or minus, so in each case the thickness of the parts used in any particular gasket assembly may vary substantially unless each is measured and then selectively matched with appropriate mating parts.

It will be apparent that if a particular gasket assembly will produce an acceptable and effective seal in use when one part in the center of the tolerance range is used with another part in the center of its tolerance range, if one part on the high side of one tolerance range is used with another part on the low side of the other tolerance range, this mis-matched assembly may not properly distribute the available load for effective sealing at one or more zones of the head and block to be sealed.

Accordingly, to provide effective gasket assemblies which are assured of sealing, it is sometimes necessary actually to measure the thicknesses of the parts to be assembled after manufacture of the parts to make certain that even though some tolerance in their manufacture is permissible, when used with another part, the actual measured tolerance is acceptable in the finished product. This procedure of physically securing manufactured parts and then matching them with other parts substantially increases the cost of manufacture and frequently becomes prohibitively expensive. The alternative sometimes resorted to is to assemble parts which fall within the tolerance ranges without measuring them, a less than desirable practice, sometimes resulting in oil and water leaks and the like.

In accordance with the present invention, and despite tolerances which are permissible for manufacturing the various components, an armored gasket assembly having a wire ring is provided which consistently and regularly provides for the effective distribution of available head load at the combustion openings and in the area of the main gasket body in accordance with design parameters. This proper distribution of load is achieved notwithstanding variations in thicknesses of the components used and variations in the compression characteristics of the components, a further possible variable in the gasket components which is sometimes encountered.

The improved balance in the distribution of the available head load to the two zones of an armored gasket assembly results from subjecting an assembled armored gasket assembly during the manufacturing process to a compressive load substantially equal to, or preferably greater than the available design head load to be applied to the gasket assembly in use. The actual precompression load to which the gasket assembly should be subjected during manufacture depends upon many factors, such as the thicknesses of the components, the ranges of tolerances permitted in the manufacture of the components, the available head load in the application for which the gasket assembly has been designed, the compression properties of the several components, and the like. The effect of precompressing the completed gasket assembly is that the thickness, the load bearing and the compression characteristics of the components is changed so that under compression in the engine in which the gasket is to be used, an acceptable and suitable balance between the compressive loading in the zones of the armoring and the main body portion will be achieved. Also, precompression of the completed gasket assembly as a finished assembly, rather than as separate parts, provides mutual control over the overall gasket assembly and its characteristics, thereby to assure effective sealing and reasonably proper distribution of the head load in all zones of the final head gasket assembly.

In accordance with this invention, other advantages are achieved. In addition to the elimination of the need for custom thickness selection of the gasket components, this invention makes possible the use of wire rings in some applications where low available head loads would normally preclude their use. Further the present invention makes it possible to use thicker wire rings in applications where thinner wire rings are now used, thereby increasing the hoop strength and heat resistance of the armoring and wire ring. Thus, a given engine may sometimes be usable to provide a somewhat higher engine output because the head gasketing can be made to seal more effectively. Also, the precompression of the gasket assembly tends to produce a gasket which exhibits reduced torque loss and relaxation of the gasket, particularly in the main gasket body portion, contrary to what frequently occurs after a conventionally manufactured head gasket has been installed under available design head load.

These and other features and advantages of this invention are apparent from the following description and drawings of which:

Figure 1:
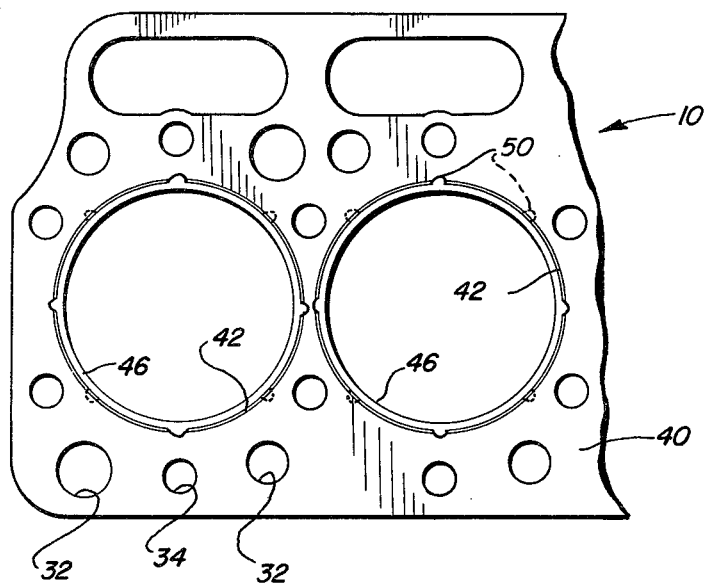
FIG. 1 is a plan view of a cylinder head gasket assembly made in accordance with the principles of this invention.
Figure 2:
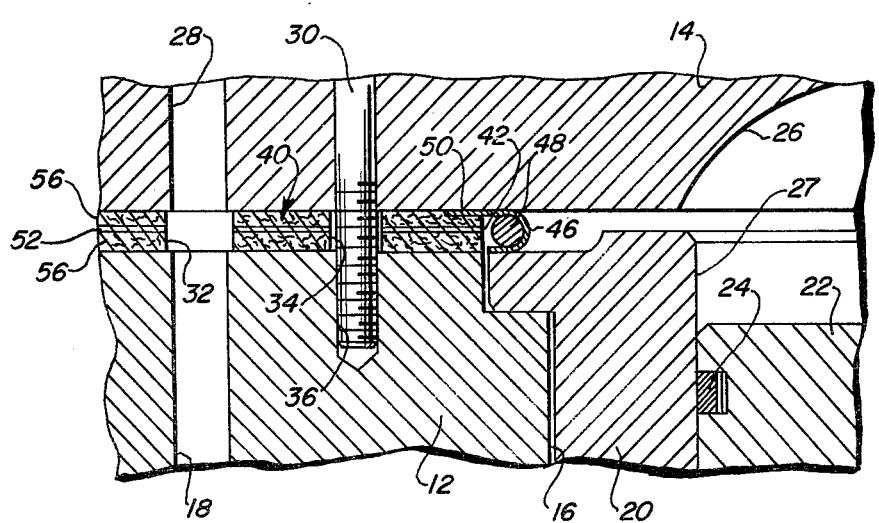
FIG. 2 is a cross-sectional view of a cylinder head gasket assembly of FIG. 1 assembled with a head and engine block.

Referring first to FIGS. 1 and 2, a head gasket assembly 10 of this invention is adapted and proportioned to cooperate with an engine block 12 and an engine head 14 to seal them with respect to each other. It is, of course, apparent that a variety of engine block and head configurations, hence different head gasket assembly configurations, may be employed in accordance with this invention.

Block 12 defines a plurality of apertures including a plurality of liner bores 16 and a plurality of oil or water bores such as cylindrical bores 18. Only one of each of the bores 16 and 18 is illustrated in FIG. 2. Liner bore 16 may be fitted with cylinder sleeve 20 which suitably sealingly engages the associated liner bore and serves to cooperate with a piston 22 and piston ring 24 in a known manner. Head 14 may define a dome-shaped portion 26 overlying cylinder bore 27, and further defines a plurality of oil and water bores 28 which are aligned with complementary bores 18. Threaded bolts or studs 30 connect the head and block and serve as the means for torquing the gasket assembly 10 into sealing engagement with the block and head around the several apertures in the gasket assembly and in the zone of the main body of the gasket assembly.

As seen in FIGS. 1 and 2, gasket assembly 10 defines a plurality of apertures or openings. These include oil and water apertures 32 which are proportioned and positioned to surround the confronting ends of bores 18 and 28, thereby to permit flow communication between bores 18 and 28 and to seal against leaking of fluid beyond the apertures 32. Of course such a seal requires the effective compression of the main gasket body between the adjacent head and block portions of the engine. Bolt holes 34 are also provided in the gasket assembly to accommodate passage of torquing bolts 30 through head 14 and into threaded engagement with cooperating threaded holes 36 in the block.

Gasket assembly 10 further defines a plurality of apertures or combustion openings which surround the cylinder bores, adjacent which openings the cylinders are sealed from the surrounding portions of the main gasket body. To that end, the main gasket body 40 defines a plurality of clear-through combustion openings 42. A second gasket portion or fire ring is provided within openings 42. The second gasket portion comprises a generally U-shaped metallic annulus 46 which is generally coplanar with the main gasket body 40 and which is positioned at the periphery of the combustion opening 42. A wire ring, such as a circular wire ring 48 is suspended in the combustion opening 42 and is enclosed in the closed end of the U-shaped annulus 46 to assist in sealing the combustion openings from the main gasket body 40. The open end of the U-shaped annulus may extend to the periphery of the combustion openings 42 to be supported by the gasket assembly within the combustion opening as illustrated, or may overlap the peripheral edge of the gasket body, generally as shown in U.S. Pat. No. 3,532,349. When spaced away as illustrated in the drawings, the annulus 46 may be supported in the combustion opening in the main body portion, as by tabs 50 extending extending outwardly from the U-shaped annulus, such as in the manner illustrated in U.S. Pat. No. 3,565,449.

Typically the main body portion 40 comprises a multilayer assemblage. In the embodiment illustrated, the main body portion comprises three layers. Central layer 52 is an expansive metallic core or sheet to which sheets 56 are secured as by bonding. Sheets 56 are compressible and heat resistant and may be of an impregnated or elastomeric bonded asbestos material. A nitrile rubber may be used as the bonding agent and the three layers, the sheets 56 and the layer 52, may each be about 0.015 inch thick. Alternatively, the central metal sheet 52 may be relatively thicker and the sheets 56 may be relatively thinner and they may be laminated to each other, as by a suitable adhesive. Usually the main body portion 40 is made by suitably securing the several sheets each to the other, following which the apertures and openings are formed, as by punching. The relative thicknesses of sheets 52 and 56 and the materials are generally selected to accommodate a particular application. The particular application also is determinative of the materials and dimensions of the wire ring 48 and annulus 46 to be assembled with the appropriately dimensioned main body 40.

Main body portion 40, annuli 46 and wire rings 48, having been appropriately manufactured within acceptable tolerance ranges, are then assembled in a manner known to the art to produce what is normally considered to be a completed product ready for sale and use. As explained, depending upon the manner in which the parts assembled were selected, a more or less satisfactory seal might be expected and more or less of the available head load would be taken up by the armoring, leaving more or less available to effect sealing in the main body portion. Also, some of the available head load would normally be required to embed tabs 50 in sheets 56 surrounding the combustion openings.

In accordance with the present invention, the completed self-supporting, unused head gasket assembly 10 rather than being readied for shipment and subsequent installation in an engine in accordance with conventional practice, is first subjected to a further manufacturing step. To that end, the completed, unused assembly is placed in a precompression press means, such as a press having a pair of faces conforming substantially to the block and head of the engine for which the gasket assembly has been designed and manufactured, for example a press having the dimensions and spacing of the head and block illustrated in FIG. 2, or other suitable press means such as a pair of flat press faces. Thus, to the extent that a cylinder sleeve, such as sleeve 20 is used in the particular application, the press faces may be shaped to incorporate that configuration as part of the overall press assembly. Where desired, the spacing between the confronting press portions may be slightly less or slightly more in selected zones than they would otherwise be in the actual engine. In that manner, the press will precompress the gasket assembly somewhat more or less in particular zones, thereby also to adjust for a typical engine in which the gasket is to be used to the range of available load portions which the main body portion and the fire ring will take up, respectively, in the ultimate use of the gasket. Where the fire ring armoring overlies the main gasket body, the initial coining force may be applied by the press, thereby to eliminate that as a factor when the gasket assembly itself is used in the environment for which it has been designed.

The force applied in the press may substantially equal the available design head load in the particular application for which the gasket was designed, or preferably the force may substantially exceed the design load by 20 percent or more, depending in part upon how and where the head load is to be distributed to the installed gasket. Most preferably, where the gasket and fire ring are intended to be of generally the same thickness, the force applied in the press should be sufficient to precompress the fire ring to a thickness less than the uncompressed thickness of the main gasket body. In that manner, one may be assured that, in use, the main gasket body will begin to be loaded (hence, will certainly seal) before the fire ring begins to take up available head load. That will make certain that where a maximum fire ring is coupled with a minimum thickness body in the tolerance range, effective sealing will be accomplished. This also permits the consistent use of a slightly oversized fire ring, which will then be precompressed, to eliminate the situation where a minimum thickness wire ring is coupled with a maximum body thickness resulting in failure of the assembly for failure to seal the combustion opening.

In the embodiment described, the gasket assembly is intended to be of a generally uniform thickness and the gasket fire ring may be precompressed to a thickness slightly less than the uncompressed (and more resilient) body thickness and precompression may be discontinued at a given increment in force beyond that to precompress to body thickness (such as 10% more load) or to a given distance beyond the body thickness, such as several thousandths of an inch beyond. That will best be determined empirically for each gasket assembly. However, in some cases the fire ring may be substantially greater or lesser in thickness than the uncompressed body thickness, as where the fire ring rests on a sleeve or in a groove in the block or head. In that case, the fire ring should be precompressed to an extent compatible with the uncompressed body thickness.

By so precompressing the completed gasket assemblies each unused, preassembled gasket assembly may be "tuned" so that its characteristics in use, despite variations in manufacturing procedures and tolerances and the like, will be within satisfactory ranges, a result which is not readily achievable by the precompression or modification of individual parts prior to assembly of a completed gasket assembly.

As stated, to obtain effective sealing in use, both the fire ring and the main body portion must be compressed between the head and block. Some minimal portion of the available head load must be distributed to each position of the gasket assembly and if it is not so distributed the seal, hence the engine, will fail.

Figure 3:
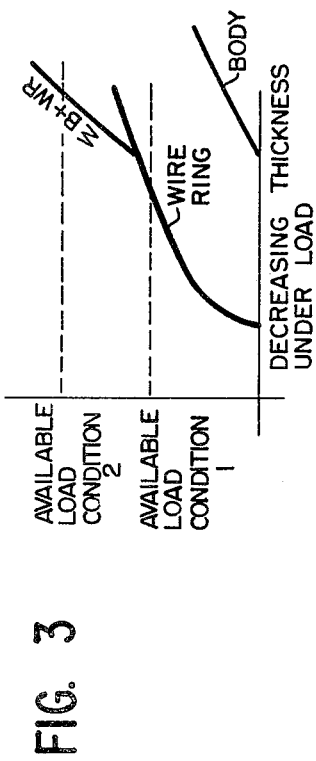
FIG. 3 is a graph showing compression characteristics of a wire ring and main body portion of a gasket assembly of FIG. 1.

For example, referring to FIG. 3, if the available head load is Load Condition 1 then compression of a given gasket assembly 10 will occur at the fire ring only and not in the main body portion. But if the available load is at Load Condition 2, compression, hence sealing, of both the fire ring and the main body portion of the given gasket assembly will be secured.

Load Condition 1, no load on the main body portion, can occur for several reasons. For example, the available load may be less than is necessary for the gasket assembly to seal properly. However, Load Condition 1 can also occur if the wire ring thickness is too great or the body thickness is too thin, in which case the available design head load, although normally adequate to seal in both zones, may not be adequate. Precompression of the assembled gasket in accordance with the present invention will eliminate that uncertainty, and will assure under a given head load for a given block and head assembly that sealing will occur both in the combustion zone and in main body portion.

Figure 4:
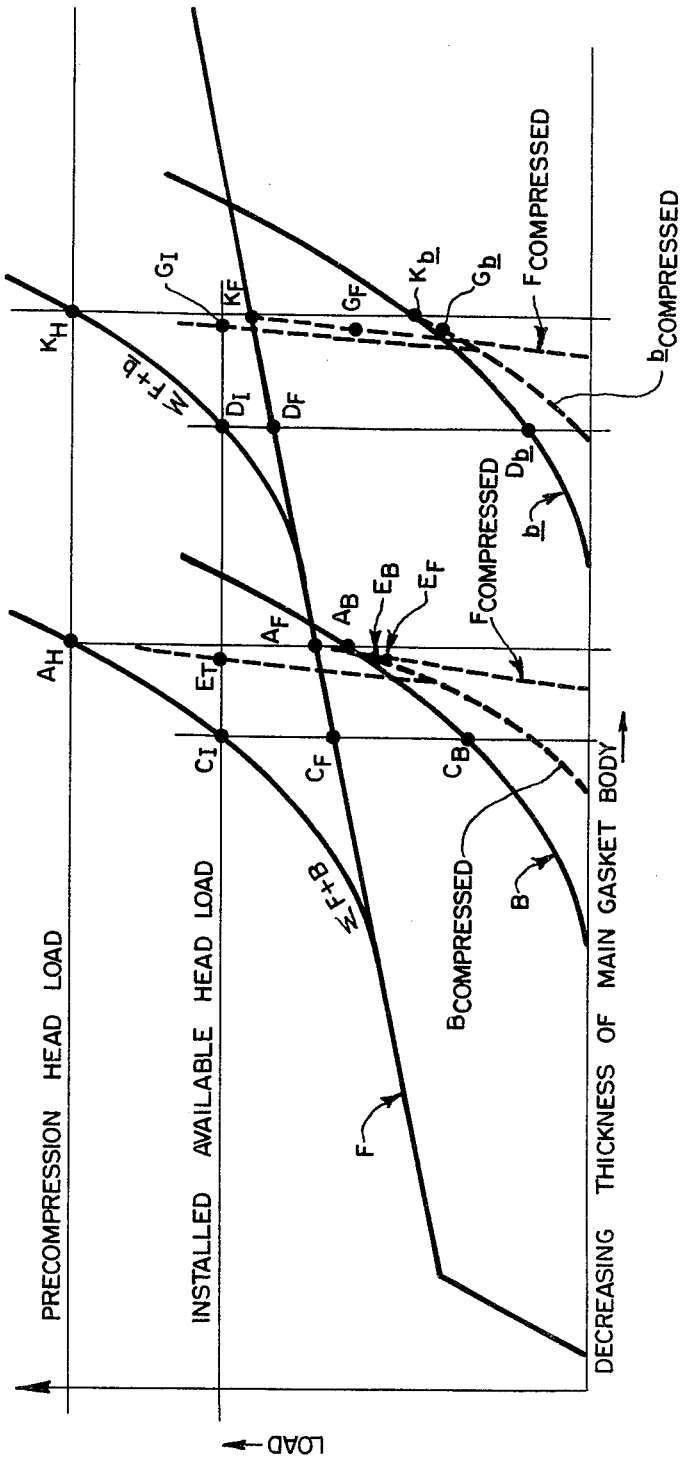
FIG. 4 is a graph showing representative sealing characteristics of unused head gasket assemblies which have been precompressed and those which have not been precompressed.

Reference to FIG. 4 will assist in an understanding of how the precompression of typical pre-assembled gasket assemblies having fire rings assures uniformly satisfactory load distribution when installed.

In FIG. 4 an assumed fire ring F of a given material and dimensions enclosed in armoring of a given material and dimensions is shown as decreasing in thickness under compression as load increases, in a generally straight line relationship within the load conditions normally encountered. Two main gasket bodies, thick body B and thin body b are also represented by curves representative of how they decrease in thickness as the load on them increases. Also shown are two lines representing, first an installed available head load which would be encountered in use between a head and block, i.e. the design head load applied when the gasket assembly, head and block are assembled, and second a higher precompression head load.

Referring first to the typical thick body B, when body B is assembled with ring F and compressed it will be seen that each of the ring F and the body B will be under substantial compressive loads when the installed available head load is used up. That is shown by points $C_B$ and $C_F$, and by their sum $C_I$ at the installed available head load line. We shall assume that this load distribution $C_B$ and $C_F$ is satisfactory and that the load distribution is adequate to effect proper sealing both at the combustion openings and across the main body portion of the gasket assembly.

Referring now to a typical thin body b, when body b is assembled with ring F, the comparable load distribution at the installed available head load is shown by points $D_b$ and $D_F$, and their sum by point $D_I$ at the available head load.

It will be apparent that far less body loading at the installed head load occurs with body b than with body B. In this case the load on body b is assumedly inadequate (at point $D_b$) to provide the necessary seal because the assumed minimum acceptable load as represented by the level at point $C_B$ has not been reached.

Thus, using the assembly having ring F and body b might well cause an engine in which it is used to fail.

Referring again to the gasket assembly having the thicker body B and to FIG. 4, when that gasket assembly is precompressed to a higher precompression head load, its load characteristics are altered, so that the total available load shown at point $A_H$ is distributed between the body and ring as represented by points $A_B$ and $A_F$, respectively.

When that precompressed gasket assembly is relieved of the precompression head load and removed from the precompression press, and is then installed in a head and block assembly, both the wire ring and the main gasket body will have somewhat different characteristics due either to changes in the compression curves of the materials or due to some permanent deformation as a result of precompression or both. In any event, when torqued down with the installed available head load between a head and block as represented by point $E_T$, the precompressed body (B compressed) and fire ring (F compressed) will follow the curves shown in dotted line on FIG. 4 and will exhibit a load distribution respectively as $E_B$ and $E_F$. This is a satisfactory distribution, and the load on the body B is well in excess of that assumed minimally acceptable level $C_B$.

Referring now to the gasket having the thinner gasket body b, when that gasket assembly is precompressed under precompression load $K_H$, the load is distributed between body b and ring F as represented by points $K_b$ and $K_F$. When removed from the precompression press and installed under the available installed head load $G_I$, the load distribution is then represented by points $G_b$ and $G_F$, an acceptable distribution and one in which the load level imposed on the body b is above the minimally acceptable level $C_B$. That is well above the level $D_b$ which, for the same gasket assembly having a thin gasket body b, had been unacceptable when installed at the installed available head load.

Thus it is seen that by precompressing preassembled gasket assemblies within a known tolerance range, some of the components of which might not have properly sealed under available installed head loads, such gasket assemblies, and the characteristics of the body portion and fire ring can be sufficiently altered and modified by precompression to assure that all gasket parts, within given tolerance ranges, will suitably distribute the available head load over the various portions thereof, all so that an effective seal will be obtained throughout the gasket assembly when used with the head and block assembly for which it was designed.

The particular gasket assembly considered was substantially of the construction and materials disclosed herein. In that gasket the visco-elastic material assumed a new, stiffer load compression curve below the stress level to which it had been precompressed, following which it tended to resume its original curve. The ring became very stiff below the precompression stress level and thereafter tended also to follow its original curve.

Accordingly it is apparent that the uncompressed thickness and compression characteristics of the main gasket body and fire ring have each been altered so that the precompressed gasket assembly fire ring and main gasket body display different compression characteristics and have second lesser thicknesses.

It will be appreciated that differences in the materials, their sealing and compression characteristics, available head loads, tolerance ranges, specific sealing requirements and the like all must be considered in arriving at a suitable precompression load or range of loads. Further, the precompression load may be varied in response to resistance to compression indicative of the point in time at which both the ring and the body begin to be compressed. All of these factors and relationships as well as others which will be apparent to the skilled gasket designer should be considered in arriving at an optimum precompression load or loads and a specific precompression press for a particular gasket product.

It will be apparent from the foregoing description that modifications can be made in the embodiments illustrated and described without departing from the spirit and scope of this invention. Therefore I do not intend to be limited to those embodiments but only in accordance with the appended claims.

What is claimed is:

1. A method of manufacturing a cylinder head gasket assembly for use in sealing the head and block of an internal combustion engine comprising the steps of:
   providing a completed self-supporting unused gasket assembly having an expansive main gasket body comprising a compressible heat-resistant facing sheet and defining at least one combustion opening therein, and a fire ring at said combustion opening;
   then, prior to installation of said gasket assembly in an engine, in a press means applying a precompression load to said unused gasket assembly to compress said fire ring to alter the characteristics of said fire ring; and
   relieving said gasket assembly of said precompression load; and then removing said unused precompressed gasket assembly from said press means, whereby upon recompression of said gasket assembly in an engine at the available design head load, a portion of the head load will be taken up by each of the gasket body and fire ring to assure proper sealing by the head gasket assembly.

2. A method of manufacturing a cylinder head gasket assembly for use in sealing the head and block of an internal combustion engine in accordance with claim 1 wherein said precompression load applied is at least substantially equal to the available design head load for the internal combustion engine for which the gasket assembly was designed.

3. A method of manufacturing a cylinder head gasket assembly for use in sealing the head and block of an internal combustion engine in accordance with claim 1 wherein said precompression load applied compresses the fire ring to a thickness less than the uncompressed body thickness.

4. A method of manufacturing a cylinder head gasket assembly for use in sealing the head and block of an internal combustion engine in accordance with claim 1 wherein said gasket assembly comprises a main gasket body having a central metallic core and a pair of compressible heat-resistant facing sheets, one at each major surface of said core.

5. A method of manufacturing a cylinder head gasket assembly for use in sealing the head and block of an internal combustion engine in accordance with claim 4 wherein said fire ring comprises a generally U-shaped metallic annulus enclosing a wire ring positioned at the periphery of said combustion opening.

6. A method of manufacturing a cylinder head gasket assembly for use in sealing the head and block of an internal combustion engine in accordance with claim 5 wherein said precompression load is at least substantially equal to the available design head load for the internal combustion engine for which the gasket assembly was designed.

7. A method of manufacturing a cylinder head gasket assembly for use in sealing the head and block of an internal combustion engine in accordance with claim 6 wherein said annulus substantially overlaps the peripheral edge of said combustion opening.

8. A method of manufacturing a cylinder head gasket assembly for use in sealing the head and block of an internal combustion engine in accordance with claim 6 wherein said annulus is supported by said gasket assembly within the combustion opening.

9. The method of claim 1 in which said fire ring is of a thickness greater than the uncompressed thickness of said body, and precompressing said fire ring to a thickness which is less than said uncompressed thickness at a precompression load which is in excess of the available design head load for the internal combustion engine for which the gasket assembly was designed.

10. A method of manufacturing a cylinder head gasket assembly for use in sealing the head and block of an internal combustion engine comprising the steps of:

providing a completed self-supporting unused gasket assembly having an expansive main gasket body comprising a compressible heat-resistant facing sheet and defining at least one combustion opening therein, and a fire ring at said combustion opening;

then, prior to installation of said gasket assembly in an engine, in a press means applying a precompression load to said unused gasket assembly to compress each of said body and said fire ring to alter the characteristics of each of said body and said fire ring; and relieving said gasket assembly of said precompression load; and then removing said unused precompressed gasket assembly from said press means, whereby upon recompression of said gasket assembly in an engine at the available design head load, a portion of the head load will be taken up by each of the gasket body and fire ring to assure proper sealing by the head gasket assembly.

11. A method of manufacturing a cylinder head gasket assembly for use in sealing the head and block of an internal combustion engine in accordance with claim 10 wherein said precompression load applied is at least substantially equal to the available design head load for the internal combustion engine for which the gasket assembly was designed.

12. A method of manufacturing a cylinder head gasket assembly for use in sealing the head and block of an internal combustion engine in accordance with claim 11 wherein said gasket assembly comprises a main gasket body having a central metallic core and a pair of compressible heat-resistant facing sheets, one at each major surface of said core, said fire ring comprising a generally U-shaped metallic annulus enclosing a wire ring positioned at the periphery of said combustion opening.

13. A method in accordance with claim 10 wherein said precompression load precompresses said fire ring to a thickness less than the uncompressed thickness of said gasket body.

14. An unused head gasket assembly comprising a self-supporting assembled head gasket assembly comprising an expansive main gasket body having an expensive core having a pair of major surfaces and at least one compressible heat resistant facing sheet secured to a said major surface and together defining a clear-through combustion opening and a fire ring at said combustion opening, said fire ring having been of first thickness and compression characteristics when initially assembled, the improvement comprising said fire ring displaying second different thickness and compression characteristics resulting from the precompression of said unused self-supporting assembled head gasket assembly at a precompression load at least sufficient to precompress said fire ring to a thickness less than the uncompressed thickness of said body.

15. An unused head gasket assembly in accordance with claim 14 wherein said gasket assembly comprises a compressible heat resistant facing sheet secured to each major surface of said core.

16. An unused head gasket assembly in accordance with claim 15 wherein said gasket assembly comprises a fire ring having a generally U-shaped metallic annulus enclosing a wire ring and positioned at the periphery of said combustion opening.

17. An unused head gasket assembly in accordance with claim 14 wherein said assembled head gasket assembly has been precompressed at a precompression load at least substantially equal to the available head load.

18. An unused head gasket assembly comprising a self-supporting assembled head gasket assembly comprising an expansive main gasket body having an expansive core having a pair of major surfaces and at least one compressible heat resistant facing sheet secured to a said major surface and together defining a clear-through combustion opening and a fire ring suspended in said combustion opening, each of said main gasket body and said fire ring having had first thicknesses and compression characteristics when initially assembled, the improvement comprising said main gasket body and said fire ring each displaying second different compression characteristics and said fire ring having a different lesser thickness resulting from the precompression of said unused self-supporting assembled head gasket assembly at a precompression load at least sufficient to precompress said fire ring to a thickness less than the first thickness.

19. An unused head gasket assembly in accordance with claim 18 wherein said gasket assembly comprises a compressible heat resistant facing sheet secured to each major surface of said core, and said fire ring comprises a generally U-shaped metallic annulus enclosing a wire ring and positioned at the periphery of said combustion opening.

20. An unused head gasket assembly in accordance with claim 19 wherein said assembled head gasket assembly has been precompressed at a precompression load at least equal to the available head load.

* * * * *